US012017833B2

(12) United States Patent
Stringer et al.

(10) Patent No.: US 12,017,833 B2
(45) Date of Patent: Jun. 25, 2024

(54) CONTAINER HAVING A SELF-SUPPORTING COVER FOR AN OUTLET

(71) Applicant: Schoeller Allibert GmbH, Schwerin (DE)

(72) Inventors: John Andrew Stringer, Brownhills (GB); Andrew Christopher Cope, Essington-South (GB)

(73) Assignee: Schoeller Allibert GmbH, Schwerin (DE)

( * ) Notice: Subject to any disclaimer, the term of this patent is extended or adjusted under 35 U.S.C. 154(b) by 270 days.

(21) Appl. No.: 17/606,422

(22) PCT Filed: Mar. 25, 2020

(86) PCT No.: PCT/EP2020/058409
§ 371 (c)(1),
(2) Date: Oct. 25, 2021

(87) PCT Pub. No.: WO2020/221519
PCT Pub. Date: Nov. 5, 2020

(65) Prior Publication Data

US 2022/0212850 A1 Jul. 7, 2022

(30) Foreign Application Priority Data

Apr. 30, 2019 (EP) .................................... 19172036

(51) Int. Cl.
*B65D 77/04* (2006.01)
*B65D 77/06* (2006.01)
*E05D 11/10* (2006.01)

(52) U.S. Cl.
CPC ....... *B65D 77/0466* (2013.01); *B65D 77/061* (2013.01); *E05D 11/1007* (2013.01);
(Continued)

(58) Field of Classification Search
CPC .............. B65D 77/0466; B65D 77/061; E05D 11/1007; E05D 11/1028
(Continued)

(56) References Cited

U.S. PATENT DOCUMENTS 3,629,901 A 12/1971 Wolf et al.
5,156,268 A * 10/1992 Nichols .............. B65D 77/0466 206/386

(Continued)

FOREIGN PATENT DOCUMENTS

CN 201553333 U 8/2010
CN 102785829 A 11/2012

(Continued)

OTHER PUBLICATIONS

Search Report received in International Application No. PCT/EP2020/058409 dated Jun. 3, 2020, with translation, 6 pages.

(Continued)

*Primary Examiner* — J. Gregory Pickett
*Assistant Examiner* — Niki M Eloshway
(74) *Attorney, Agent, or Firm* — Christopher A. Rothe; Culhane PLLC

(57) ABSTRACT

A container for transporting and storing liquid, viscous or pourable substances, in particular a container of the Intermediate Bulk Container type. The container has a base, a side wall, and at least one outlet recess in the base and/or the side wall, in which an outlet valve is or can be arranged and which is closable on the outside of the container by a cover. The cover has a base section, by which the cover is fastened or fastenable to the container, and a closure section which is hinged on the base section via a hinge assembly such that it can pivot about a rotational axis. The hinge assembly can hold or lock the closure section in a self-supporting manner in a position releasing the outlet recess.

9 Claims, 10 Drawing Sheets

(52) U.S. Cl.
CPC .................... *E05D 11/1028* (2013.01); *B65D 2519/00034* (2013.01); *B65D 2519/00288* (2013.01); *B65D 2519/00338* (2013.01); *B65D 2519/00711* (2013.01); *E05Y 2900/604* (2013.01)

(58) Field of Classification Search
USPC ........................................................... 220/1.6
See application file for complete search history.

(56) References Cited

U.S. PATENT DOCUMENTS

| | | | | |
|---|---|---|---|---|
| 5,316,174 | A | 5/1994 | Schutz | |
| 5,924,589 | A | 7/1999 | Gordon | |
| 10,308,496 | B2 | 6/2019 | Nini | |
| 2005/0145521 | A1 * | 7/2005 | Perkins | B65D 77/061 206/386 |
| 2006/0032854 | A1 * | 2/2006 | Schutz | B65D 1/46 220/562 |
| 2007/0199937 | A1 | 8/2007 | Schutz | |
| 2011/0272400 | A1 | 11/2011 | Huizingh | |
| 2015/0225137 | A1 | 8/2015 | Wei et al. | |
| 2016/0228831 | A1 * | 8/2016 | Saude | G05D 11/132 |
| 2017/0096253 | A1 | 4/2017 | Adams | |
| 2019/0382178 | A1 | 12/2019 | Weyrauch | |
| 2020/0148434 | A1 | 5/2020 | Klosterbuer et al. | |
| 2020/0354133 | A1 | 11/2020 | Kellerer | |

FOREIGN PATENT DOCUMENTS

| | | | | | |
|---|---|---|---|---|---|
| CN | 106794978 | A | | 5/2017 | |
| DE | 10161693 | A1 | * | 7/2003 | B32B 15/14 |
| DE | 102007020886 | A1 | | 11/2008 | |
| DE | 102009005212 | A1 | | 7/2010 | |
| EP | 2894111 | A1 | | 7/2015 | |
| FR | 2830000 | A1 | | 3/2003 | |
| WO | WO-9919220 | A1 | * | 4/1999 | B65D 77/061 |
| WO | 2011046628 | A1 | | 4/2011 | |
| WO | 2015131137 | A1 | | 9/2015 | |

OTHER PUBLICATIONS

Office Action received in Chinese Application No. 202080032601.4 dated Aug. 23, 2022, with translation, 14 pages.
Written Opinion received in International Application No. PCT/EP2020/058409 dated Jun. 3, 2020, with translation, 10 pages.
Notice of Allowance received in U.S. Appl. No. 17/607,123 dated Oct. 12, 2023, 21 pages.

* cited by examiner

CONTAINER HAVING A SELF-SUPPORTING COVER FOR AN OUTLET

CROSS-REFERENCE TO RELATED APPLICATIONS

This application is the United States national phase entry of International Application No. PCT/EP2020/058409, filed Mar. 25, 2020, and claims the benefit of priority of European Application No. 19172036.6, filed Apr. 30, 2019. The contents of International Application No. PCT/EP2020/058409 and European Application No. 19172036.6 are incorporated by reference herein in their entireties.

FIELD

The present invention relates to a container for transporting and storing liquid, viscous, or free-flowing substances, in particular of the intermediate bulk container type, having a bottom, a side wall, and at least one outlet recess in the bottom and/or in the side wall, in which an outlet valve is arranged or arrangeable and which is closable via a cover on the container side.

BACKGROUND

So-called Intermediate Bulk Containers (IBC) are used for the transport and storage of liquid and free-flowing substances. They are used, for example, in the production of chemicals, foodstuffs, cosmetics, and pharmaceuticals. Such containers usually have an outlet valve near the bottom, which is mounted in an outlet recess or valve-mounting duct in the outer wall of the container and via which the flowing or free-flowing contents of the container can be removed.

It is generally known in the prior art to provide such IBCs with a cover in the form of a flap on the outside of the outlet recess (of the valve-mounting duct). With such a cover, a protective effect against dust, for example, can be achieved to a certain degree. However, the known flap-like covers cannot completely cover the outlet recess in some cases, as they only dangle loosely in front of it, resulting in poor dust-tightness. In addition, in order to reach the outlet recess or the outlet valve in such known containers, the user often has to hold the cover manually in an open position, so that only one hand remains for operating or mounting the valve or for connecting a hose to it.

Another problem that frequently arises in connection with the covers described above is that they are damaged when the containers are handled with floor conveyors.

Some containers from the prior art have devices via which the cover can be latched onto the container in the open state. However, such solutions are impractical if the cover is damaged, as often both the locking device on the container as well as the cover have to be replaced.

For example, EP 2 894 111 A1 discloses a container with an outlet that is closable via a cover. The cover is divided by a hinge into a fitting portion and the flap portion, wherein the fitting portion is connected to the container by dowel pins. Closure openings are provided on the cover, which can engage with ribs on the container to hold the flap portion of the cover in an open position.

There are other solutions in the prior art where the cover is completely removed from the container to reach the outlet valve. With such containers, the user also has to manually place the cover on the outlet recess again after installing the valve or performing an emptying process, which increases the number of work steps required. In addition, with such containers the cover has to be stowed away in the dismantled state so that it does not become lost.

There is a need for a container for the transport and storage of liquid, viscous, or free-flowing materials, in particular of the intermediate bulk container type, which provides a cover for an outlet recess of the container with improved handling, which advantageously is also easily replaceable in case of a defect.

SUMMARY

In principle, a container according to the invention for transporting and storing liquid, viscous, or free-flowing substances has a bottom, a side wall and at least one outlet recess in the bottom and/or in the side wall, in which an outlet valve is arranged or arrangeable. The outlet recess can be closed on the outside of the container via a cover. The cover has a base portion and a closure portion. The base portion is configured to be attached or attachable to the container. The closure portion is configured to be able to close the outlet recess. The closure portion is hinged to the base portion via a hinge assembly so as to be pivotable about a rotation axis, so that the closure portion is transferable from a first position closing the outlet recess to a second position releasing the outlet recess. The hinge assembly is configured to hold or lock the closure portion in the second position releasing the outlet recess in a self-supporting manner. In other words, a pivotable cover/flap for an outlet recess of a container is configured such that its hinge assembly locks/secures the closure portion or the flap of the cover in the open position. Moreover, when the cover is opened upwards (against gravity), the holding force of the locking device is designed to be at least strong enough to hold the closure portion against gravity in a self-supporting manner.

In this case, the hinge assembly is configured as a curved film hinge which, depending on its relative position with respect to a pressure point, is prestressed either into the first position closing the outlet recess, or into the second position releasing the outlet recess. By introducing a curvature or bend into the film hinge, tension can be easily applied to the hinge and a snap effect can be created.

In such a case, the film hinge forms in particular a prestressing or spring element configured to prestress/hold the closure body in the second, open position.

Such an embodiment of the invention has the advantage that under the prestressing action, the cover can be automatically transferred into a defined, open position, i.e. even if a user does not fully open the cover manually, the cover snaps into a fully open position by itself.

The container according to the invention has the advantage that the cover can be reliably held in an open position when the outlet recess or the outlet valve have to be reached. This means that the user has both hands free for assembly or operating activities on the valve, and it also prevents the cover from being closed accidentally during an assembly operation. According to the invention, locking in the open position is accomplished by the hinge assembly of the cover per se. This has the advantage that the entire locking mechanism is part of the cover and can be easily replaced together with the cover in the event of a defect.

Preferably, the container may be a bulk carrier of the intermediate bulk container type having an internal tank with an outlet valve housed within an external support structure of bottom and side wall.

According to a preferred aspect of the invention, the hinge assembly may be configured as a bistable hinge that is prestressed either to the first position closing the outlet recess or to the second position releasing the outlet recess, depending on its relative position with respect to a pressure point. In other words, the hinge of the cover may be configured as a so-called snap hinge, that it is either snapped into a defined closed position or a defined open position, depending on the relative position of the closure portion relative to a pressure point. Such an embodiment has the advantage that the cover is always either in a completely closed position or in a defined open position, thus preventing operating errors such as incomplete closure of the cover.

In accordance with a preferred aspect of the invention, the cover may be manufactured in one piece as a plastic component, in particular from a thermoplastic material. This makes it possible to design the cover as a replacement part that is easy to manufacture and inexpensive to produce. According to a further preferred embodiment, the bistable hinge may be configured as a film hinge assembly. The implementation of the hinge as a film hinge supports the configuration of the cover as a simple replacement part to be manufactured in one piece. Preferably, the cover may be manufactured in one piece as an injection molded part.

In accordance with a preferred aspect of the invention, the hinge assembly may include complementary latch or friction elements at the adjacent ends of the base portion and of the closure portion configured to hold the closure portion in the second position in a self-supporting manner. Accordingly, as an alternative to an embodiment having prestressing elements, the hinge assembly may also be configured to be self-supporting by having teeth or a friction closure that engage in various pivot positions.

According to a preferred embodiment, in the second position releasing the outlet recess, the closure portion may be rotated about the pivot axis (A) by an angle of 135° to 190°, preferably between 150° and 170°, with respect to the first position. Preferably, the closure portion may be oriented substantially vertically in the first position closing the outlet recess. In commercially available containers, the closure portion in the first position closing the outlet recess is mostly oriented vertically or parallel to the container side surface. It is advantageous if the cover is rotated by slightly less than 180° from this position closing the outlet recess to the defined open position, so that on the one hand the outlet recess is reliably released, but on the other hand it is still easy to reach behind the open cover (it does not rest against the side wall).

According to a preferred embodiment, the base portion may be detachable and attachable to the container without tools. This enables fast replacement of a damaged cover. Since the complete device for locking the cover in the open position is part of the cover itself, this can also be easily replaced by replacing the cover.

According to a preferred aspect of the invention, the base portion may include a latch recess which is in particular located on a side of the base portion facing away from the hinge assembly and which is configured and provided to engage a corresponding latch projection on the container close to the outlet recess. A reverse arrangement of latch projection and latch recess is also possible. In other words, a snap connection may be provided for easy, tool-free clipping of the cover to the container.

According to a preferred embodiment, the base portion may have a guide rib and the container may have a corresponding guide slit in the area of the outlet recess. In this way, the assembly of the cover on the container can be further simplified.

According to a preferred embodiment, both the base portion and the closure portion may have a substantially plate-like structure and may be joined together at adjacent side edges by the hinge assembly. Such a shape enables a simple tool design for the production of the cover.

According to a preferred aspect of the invention, in the first position closing the outlet recess, the closure body may fit flush into the outer surface of the bottom and/or of the side wall. Such a configuration of the container and of the cover avoids damage to the latter, since no edge of the cover in the closed position protrudes from the container side surface on which one could get caught. For this purpose, an area of the outer surface of the container adjacent to the outlet recess may preferably be indented so that the cover, which is in particular plate-shaped, can be inserted/placed into the indent.

A container for transporting and storing liquid, viscous, or free-flowing substances has a bottom, a side wall and at least one outlet recess in the bottom and/or the side wall, in which an outlet valve is arranged or arrangeable. The outlet recess is closable on the outside of the container via a cover and sealable via a sealing device to secure the cover in the closed state.

The cover preferably has a base portion and a closure portion. The base portion is configured to be attached or attachable to the container. The closure portion is configured to be able to close the outlet recess. The closure portion is hinged to the base portion via a hinge assembly so as to be pivotable about a rotation axis, so that the closure portion can be transferred from a first position closing the outlet recess to a second position releasing the outlet recess.

Preferably, the hinge assembly is further configured to hold or lock the closure portion in the second position releasing the outlet recess in a self-supporting manner.

The closure portion of the cover preferably has a cover sealing hole preferably formed on a side of the closure portion opposite the hinge assembly. The outlet recess has a transverse rib which extends transversely to the outlet recess (i.e., narrowing the outlet recess or parallel to the side wall towards which the outlet recess opens). The transverse rib forms a transverse-rib sealing hole which is aligned with the cover sealing hole of the closure portion when closed. The cover sealing hole and the transverse rib with the transverse-rib sealing hole form the sealing device and are configured to receive a seal.

Preferably, the cover sealing hole and the transverse-rib sealing hole (in short: the holes) have the same size and shape, preferably polygonal or oval, further preferably rectangular, and are oriented relative to each other. Furthermore, the transverse rib may form a circumferential collar or may extend only along a circumferential portion of the outlet recess. Preferably, the transverse rib is arranged in only one corner of the outlet recess in order to reduce its opening and/or volume as little as possible. In particular, the transverse rib is arranged on a side of the closure portion opposite the hinge assembly. This ensures a particularly secure closure of the cover. Furthermore, the transverse rib preferably forms a stop for the closure portion in the closed position. It is also useful if the transverse rib is offset towards the container inside via a setback, wherein a depth of the setback corresponds to a thickness of the closure portion. This allows the closure portion to rest against the transverse rib on the inside in the closed state and to be aligned on the outside with a side wall or with an outer surface of the bottom of the container. The cover sealing hole and the transverse-rib sealing hole are preferably completely closed circumferentially. Alternatively, however, one or both of the holes may be open towards a rim of the closure portion or towards a rim of the transverse rib. It is only necessary to ensure that the seal cannot slip out of the sealing device. For example, one of the holes may be closed all around and the second one of the holes may form a setback whose rim supports the seal on two diametrically opposite sides of the seal.

It is further advantageous if the closure portion in the area of the cover sealing hole has an indentation towards the container inside. If the seal is arranged in the sealing device, it is thus located in the indentation and is protected against damage by impacts or the like. In addition, one or more troughs are preferably provided directly next to the cover sealing hole, or possibly inside the indentation, which allow reaching under an external portion of the seal in order to remove it. In particular, it is advantageous if a trough is provided in the direction of each possible arrangement of the seal around the cover sealing hole or if an at least partially circumferential trough is provided around the cover sealing hole.

Optionally, the sealing device may be provided as a set with a cover plug, via which the cover sealing hole may be closed if a seal is not desired, in order to prevent dust or the like from penetrating or to prevent surrounding objects from getting caught in the cover sealing hole.

The seal is configured to be clippable into the sealing device, i.e., into the cover sealing hole and the transverse-rib sealing hole. In other words, the seal is designed to be inserted through the cover sealing hole and through the transverse-rib sealing hole up to a stop of the seal, wherein it locks in this position in order to connect the transverse rib and the closure portion to each other in such a way that the closure portion cannot be opened without destroying the seal. This ensures that opening of the cover by unauthorized persons is prevented or that it is at least immediately apparent, since this would lead to destruction of the seal.

More specifically, the seal has a base portion, which is preferably plate-shaped, and which forms the stop limiting the insertion of the seal through the transverse-rib sealing hole and/or the cover sealing hole. In other words, an extension of the base portion in at least one direction is larger than the widest extension of the transverse-rib sealing hole and/or preferably of the cover sealing hole. The base portion is preferably rectangular, but may have any other shape suitable for covering the hole, such as circular or oval. The base portion is connected to a spreading portion via at least one predetermined breaking point. The (anchor-shaped) spreading portion has a spring arm which spreads outwards in such a way that it forms a stop which prevents removal of the seal in a direction opposite to insertion. This means that in the expanded state, the spring arm has a larger dimension than the widest dimension of the cover sealing hole and/or preferably of the transverse-rib sealing hole. Furthermore, the spring arm is configured in such a way that when the seal is inserted through the cover sealing hole and through the transverse-rib sealing hole, it compresses and thereby narrows in order to be insertable through the holes (i.e. to fit through the holes), and that after passing through the two holes, it resiliently returns and spreads out again. Preferably, the spreading portion protrudes inwards when the seal is inserted, and thus cannot be removed from the sealing device by manually compressing the spring arm.

Preferably, the spreading portion is anchor-like, wherein at least two, preferably three or four, anchor arms are provided as spring arms, which extend outwards in different directions and preferably in the direction of the base portion. Optionally, at least two main spring arms are provided, which bear a main load, in particular a tensile load acting on the base portion, in the event of an attempt to remove the seal, and at least two secondary spring arms arranged alternately with the main spring arms, which bear a secondary load, preferably a supporting load in the event of tilting of the seal within the sealing device. In particular, the spring arms are arranged in the form of an arrow pointing in the opposite direction to the base portion. The spring arms thus form a ramp by which they are deflected inwards by pressure against a rim of the holes upon insertion into the cover sealing hole and the transverse-rib sealing hole. In the direction of the base portion, the spring arms form a hook or a stop edge so that the spring arms spread wider and/or block movement when an attempt is made to remove the seal in the direction of the base portion and prevent removal.

Further preferably, the spreading portion is eccentrically arranged on the base portion. In particular, the base portion forms a (finger) tab at least in one direction, such that the tab projects further beyond the rim of the cover sealing hole in one direction than in other directions when the seal is inserted. Preferably, the extent of the tab is such that it extends beyond the trough as described above directly adjacent to the cover sealing hole.

Furthermore, it is advantageous if the base portion and/or the spreading portion form a foot connecting the base portion and the spreading portion, wherein a foot cross-section corresponds at least partially to a cross-section of the cover sealing hole and/or of the transverse-rib sealing hole, so that rotating of the seal in the sealing device is prevented. For example, the cross-section of at least one of the holes as well as the cross-section of the foot is rectangular, wherein dimensions of the foot cross-section correspond to the dimensions of the holes or the respective hole only in one direction. Thus, the orientation of the seal in the sealing device is fixed when the seal is inserted therein. Since the seal is thus not freely movable in the sealing device, in particular it cannot twist, the risk of unintentional damage to the seal is reduced.

In addition, it has proven practical if the base portion has a through opening through which the spreading portion or preferably the predetermined breaking point between the base portion and the spreading portion can be accessed from the outside of the container, preferably (only) via a tool. In this way, the seal can also be removed if, for example, the predetermined breaking points do not break as intended or the seal cannot be gripped sufficiently well from the outside to tear it off.

The seal can also be provided with an identification element such as a barcode or something similar. This improves data acquisition and makes it possible to check the seal used. The security of the seal is thus increased.

The seal and the sealing device preferably form a system.

BRIEF DESCRIPTION OF THE DRAWING FIGURES

The present invention is explained below with reference to exemplary configuration examples, which are shown in the figures for better illustration.

DETAILED DESCRIPTION

Figure 1:
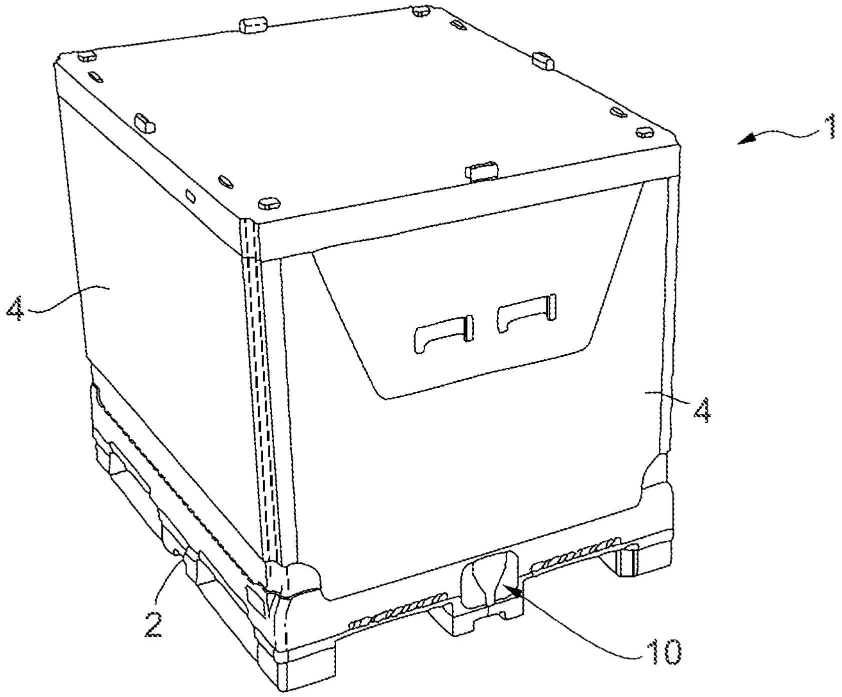
FIG. 1 is an illustration of an intermediate bulk container according to a preferred embodiment.

FIG. 1 shows a perspective view of a container 1 according to a preferred configuration example of the present invention. The container 1 shown is a so-called intermediate bulk container. Containers of this type have a bottom 2, which usually has a pallet-like underbody structure, and a side wall 4 extending upwards from the bottom. The container 1 shown also has a lid, which is not described in further detail. The elements described above form an outer structure of the container 1, which shield an internal tank or bag (not shown) from external influences and also provide stackability of identically constructed containers 1. Such intermediate bulk containers enable safe transport of liquid, viscous, or free-flowing goods. In order to be able to remove said goods from the container 1, the internal tank or bag is equipped on its underside or in a lower area with an outlet valve 8, which is not shown in greater detail in FIG. 1. In order to make this outlet valve 8 accessible from outside the container 1, the container 1 has in its outer structure, i.e. in its bottom 2 and/or its side wall 4, an outlet recess 6, which represents an opening through said outer structure or a mounting duct for the valve 8. For protection against dust and other external influences, said outlet recess 6 is protected on the outside of the container by a cover 10.

Figure 2:
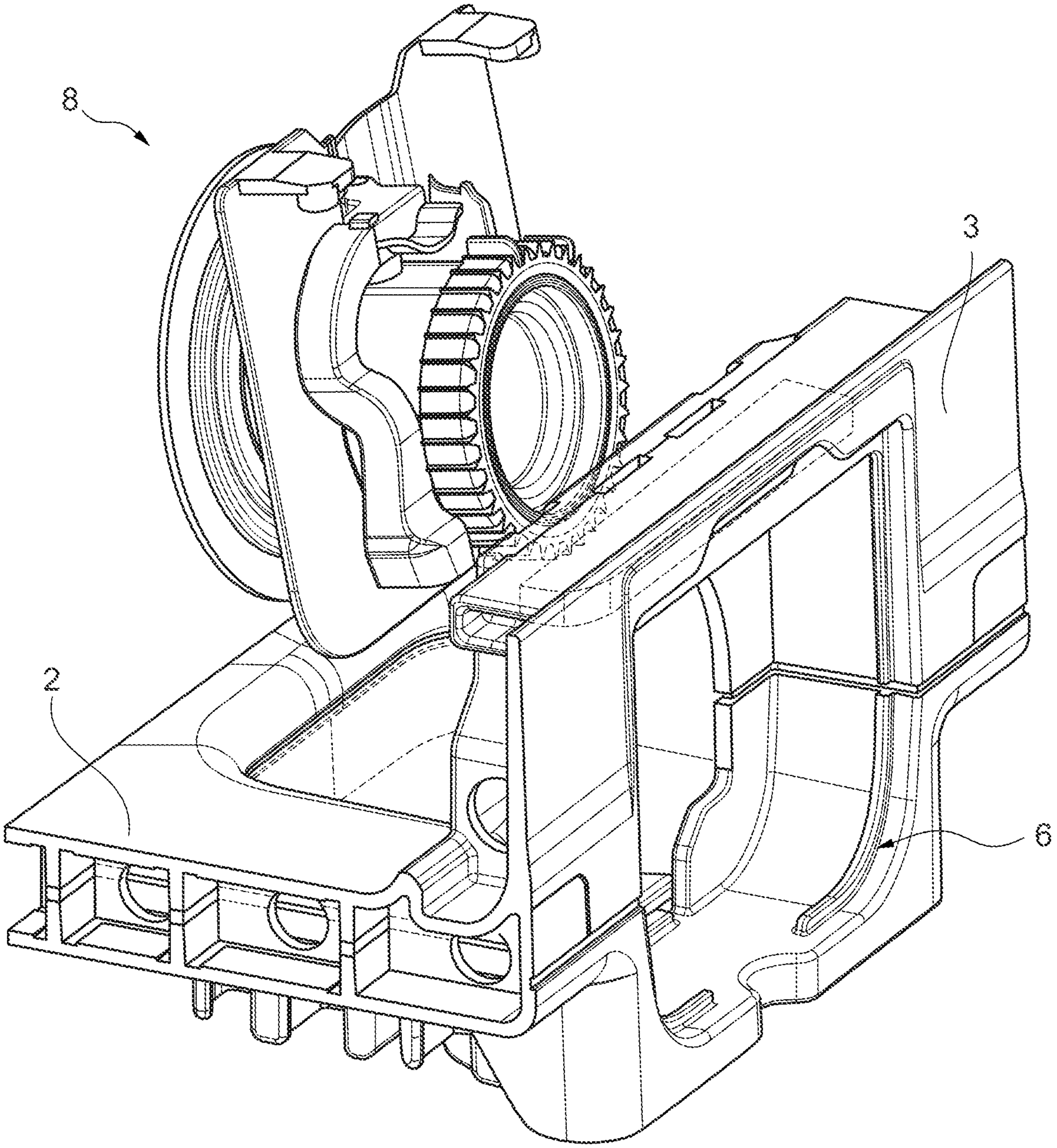
FIG. 2 is an illustration to show an outlet recess of a container according to a preferred embodiment and to show an insertion procedure for an outlet valve.

FIG. 2 shows a detailed perspective view of the outlet recess 6, which, in the preferred configuration example shown, is arranged in the container bottom 2 or in a bottom rim 3 formed by it. FIG. 2 also shows an exemplary valve assembly 8 that can be inserted into the outlet recess 6 from the inner container side.

Figure 3:
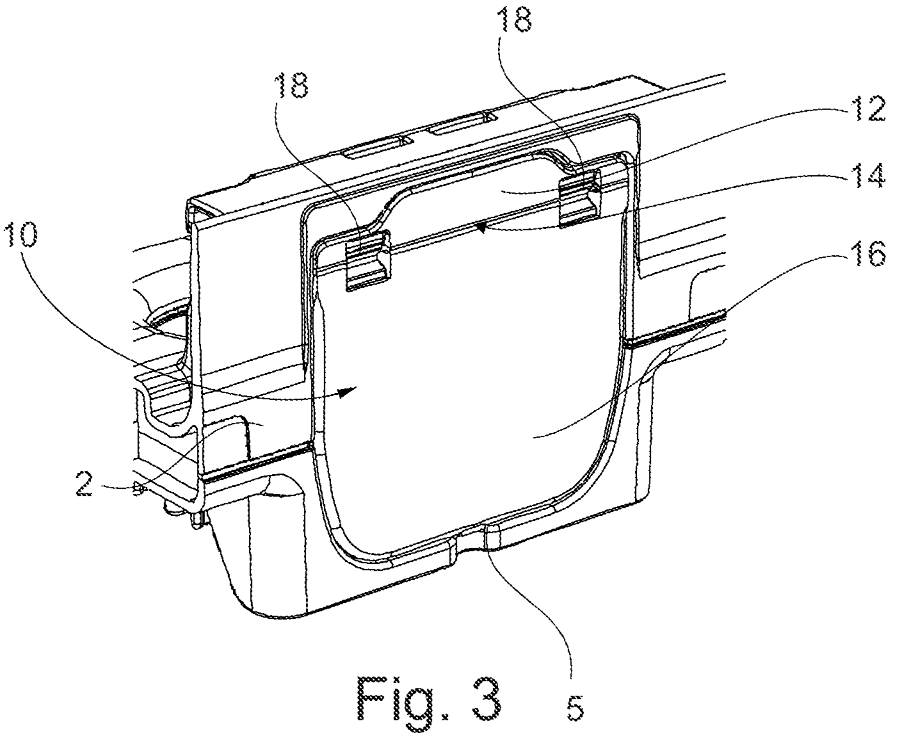
FIG. 3 is an illustration of a cover for an outlet recess according to a first preferred configuration example in a closed state.

As shown in FIG. 3, the outlet recess 6 may be closed on the outside of the container with a cover 10. The cover 10 shown here has a flap-like configuration. In its basic structure, the cover 10 has a base portion 12, which is arranged in the direction of the upper container side in the example shown and with which the cover is fixed to the container 1 or to the bottom 2, and has a closure portion 16, which represents the structure closing the outlet recess 6. The closure portion 16 is pivotably connected to the base portion 12 via a hinge assembly 14.

As can also be seen clearly in FIG. 3, the cover 10 fits substantially flat into the outer surface of the bottom rim 3. For this purpose, an area of the outer surface of the bottom rim 3 directly adjacent to the outlet recess 6 is indented relative to the remaining lateral outer surface so that the cover 10 can be inserted into this indent. In order to nevertheless ensure good accessibility to the cover 10 and to be able to open it, a handle recess 5 is provided at the lower edge of the bottom 2 adjacent to the indent into which the cover 10 is inserted.

Figure 4:
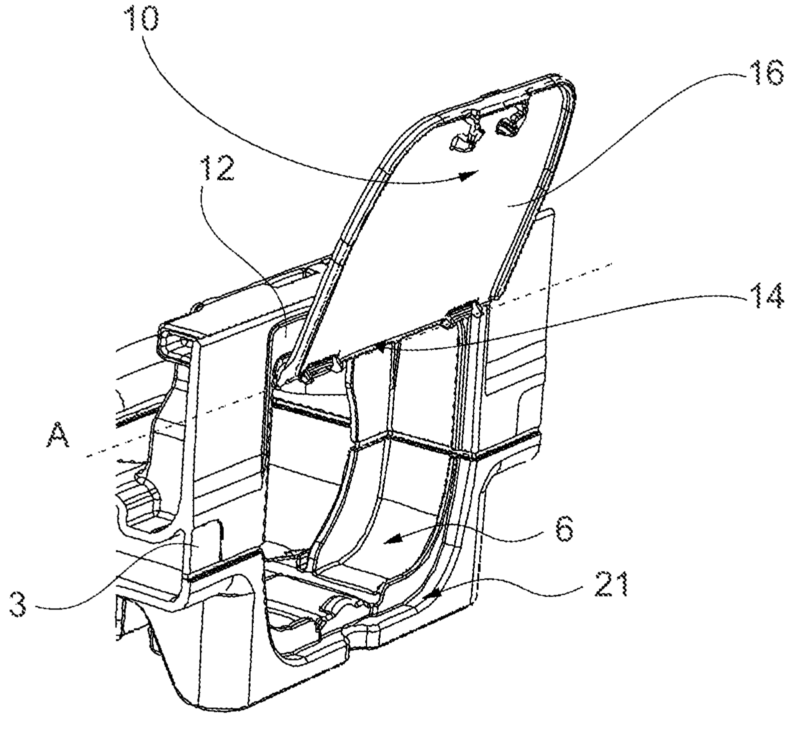
FIG. 4 is an illustration of the cover for an outlet recess in an opened state.

FIG. 4 shows the cover 10 of FIG. 3 in an open state. For opening, the closure portion 16 is pivoted about a pivot axis A defined by the hinge assembly 14. According to the invention, the shown cover 10 or its hinge assembly 14 is constructed in a self-supporting manner, i.e. it locks itself automatically in a defined open position, as will be explained in more detail below. As can be clearly seen in FIG. 4, the defined open position in which the closure portion 16 is locked is selected in such a way that the opening is completely released, but the flap is not completely pivoted by 180°, but an opening angle of between 10° to 30° remains relative to the side surface of the container 1. This has the advantage that the closure portion 16 can be more easily reached from behind for closing, since it does not rest against the side surface of the container 1.

Figure 5A:
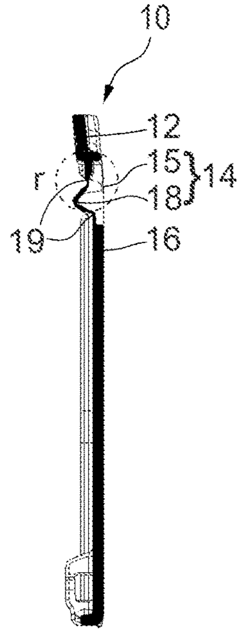
FIGS. 5A to 5C show an opening operation of the cover for an outlet recess according to the first configuration example.
Figure 5B:
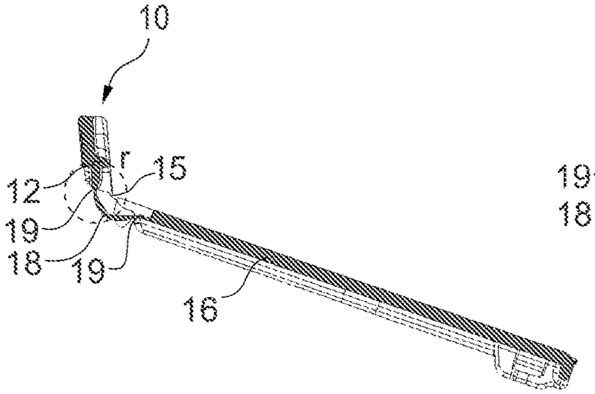
Figure 5C:
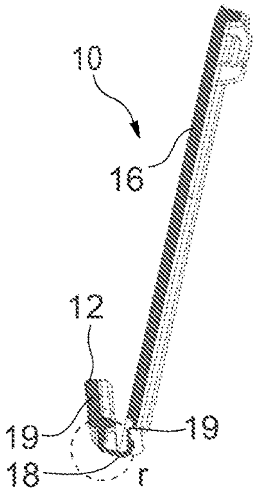

FIGS. 5A to 5C show a side view of the cover 10 with self-supporting closure body 16 according to a first configuration example. In the first configuration example, the hinge assembly 14 is formed as a so-called bistable hinge or snap hinge. The hinge assembly 14 comprises a film hinge 15, which defines the basic pivot axis A of the closure portion 16. In addition, in this example, the hinge assembly 14 has two prestressing or spring elements 18, which act here as tension spring elements, in order to achieve a snap effect of the hinge 14.

As shown in FIG. 5A, the spring element 18 is in a relaxed state in the closed state of the cover 10, in which the base portion 12 and the closure portion 16 are substantially aligned. The position of the closure portion 16 shown in FIG. 5A forms a first rest position of the bistable hinge assembly 14. In the relaxed state of the spring element 18, two end points 19 thereof have a distance r from each other. A first end point 19 of the spring element 18 is pivotally connected to the base portion 12 via a film hinge, and a second end point 19 of the spring element 18 is also pivotably connected to the closure portion 16 via a film hinge. Since the spring element 18 is pivotably connected to both the base portion 12 and the closure portion 16, the spring element 18 can follow the pivotal movement of the closure portion 16. However, since the end points 19 (film hinges) of the spring element are offset from the film hinge 15 between the base portion 12 and the closure portion 16, the spring elements 18 do not perform a concentric rotation with the closure portion 16. As a result, when the closure portion 16 is pivoted out of the position shown in FIG. 5A, the spring element 18 has to elongate.

FIG. 5B clearly shows how the distance of the two end points 19 of the spring element 18 in a pivoted position clearly exceeds the distance r from the relaxed state of the spring element 18. In other words, the spring element 18 is stretched as soon as the hinge assembly 14 leaves rest position. Therefore, at small deflections from the closed state shown in FIG. 5A, the closure portion snaps back to its original position under the prestress of the spring elements 18. The state shown in FIG. 5B represents a pressure point in which the spring element 18 is maximally stretched when the closure portion 16 is pivoted about the film hinge 15. When the closure portion 16 is pivoted further in a counterclockwise direction (in the selected illustration), the distance of the two end points 19 of the spring element 18 is shortened again. The prestressing force of the spring element 18 thus acts from exceeding the pressure point in the direction of a second relaxed state of the spring element 18 or a second rest position of the hinge assembly 14.

FIG. 5C shows this second rest position of the bistable hinge assembly 14, which represents a defined open state of the cover 10. As can also be clearly seen in FIG. 5C, the distance of the two end points 19 of the spring element 18 in this second rest position again corresponds to the distance r, as already in the first rest position. In summary, the hinge assembly 14 according to the first configuration example causes the closure portion 16 to snap upwards automatically starting from a predetermined deflection or starting from exceeding a predetermined pressure point and is held or locked in this open position by the spring force of the prestressing element 18 in a self-supporting manner. In addition, the bistable hinge is prestressed into the closed position and can thus provide better tightness during closure.

Figure 6:
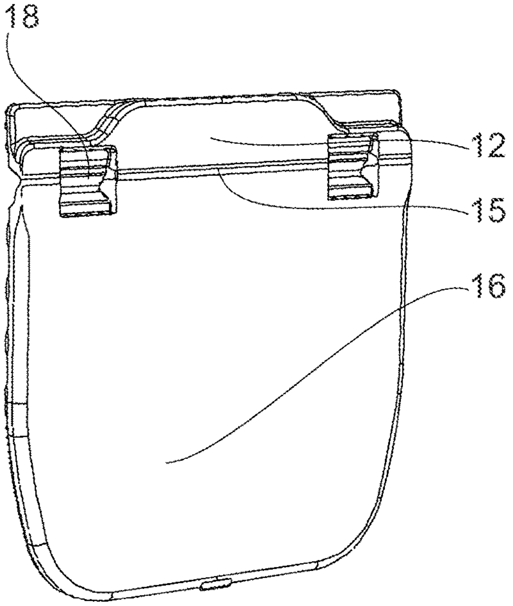
FIG. 6 shows the cover according to the first configuration example in a cut-away view.
Figure 7:
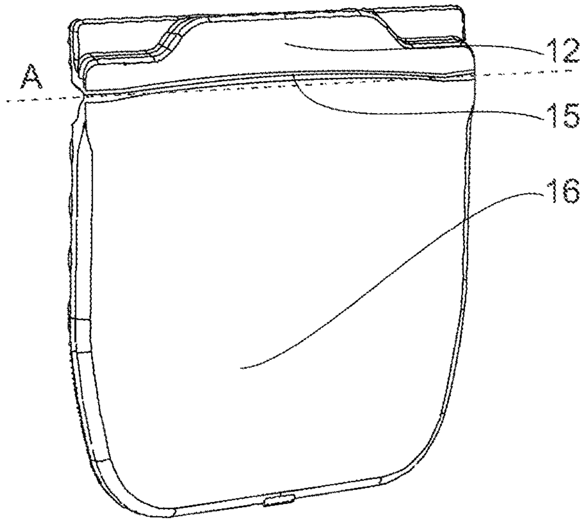
FIG. 7 shows a cover according to a second configuration example in a cut-away view.

FIG. 6 shows the cover 10 with bistable hinge assembly 14 according to a first configuration example in a cutaway view. FIG. 7 shows a second, alternative embodiment for a cover 10 with bistable hinge 15. In the embodiment of FIG. 7, the bistability or snap effect of the film hinge 15 is created by introducing a bend into the film hinge. Since the course of the film hinge 15 no longer coincides with the pivot axis A defined by it due to the incorporation of the bend, the film hinge 15 in this embodiment functions per se as a resilient bending element that creates a snap effect.

Figure 8:
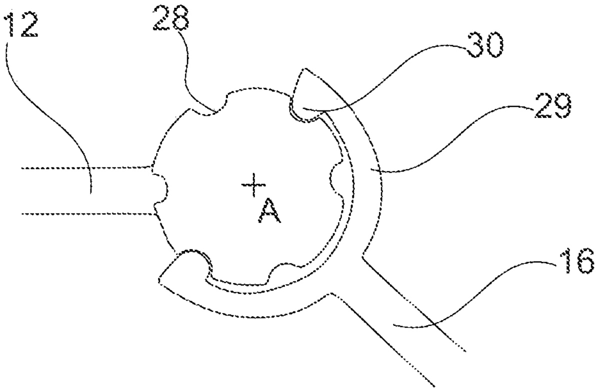
FIG. 8 shows a latch mechanism for a self-supporting cover according to a third configuration example.

FIG. 8 shows another alternative embodiment of the present invention, in which the self-supporting cover is not realized via a bistable hinge but via complementary latch elements 28, 30 between base portion 12 and closure portion 16. As can be seen in FIG. 8, the base portion 12 in the example shown has a kind of teeth running coaxially to the pivot axis A in the circumferential direction of the hinge assembly 14, into which locking projections 30 carried on resilient arms 29 engage. The geometry of the teeth 28 and of the projections 30, together with the spring force of the arms 29, is adjusted in such a way that manual pivoting of the hinge assembly is easily possible, but the holding force generated by the complementary latch elements 28, 30 is sufficient to hold the closure portion 16 in a self-supporting manner.

The cover 10 according to the preferred embodiment is provided with a latch mechanism that is detachable and attachable without tools. In particular, the illustrated preferred embodiment of the cover 10 can be attached to the container 1 in an uncomplicated manner via a latch mechanism. This is advantageous, since the cover is a wearing part of the container 1. Corresponding covers 10 are often damaged when handling containers 1 via floor conveyors such as forklifts.

Figures 9A, 9B:
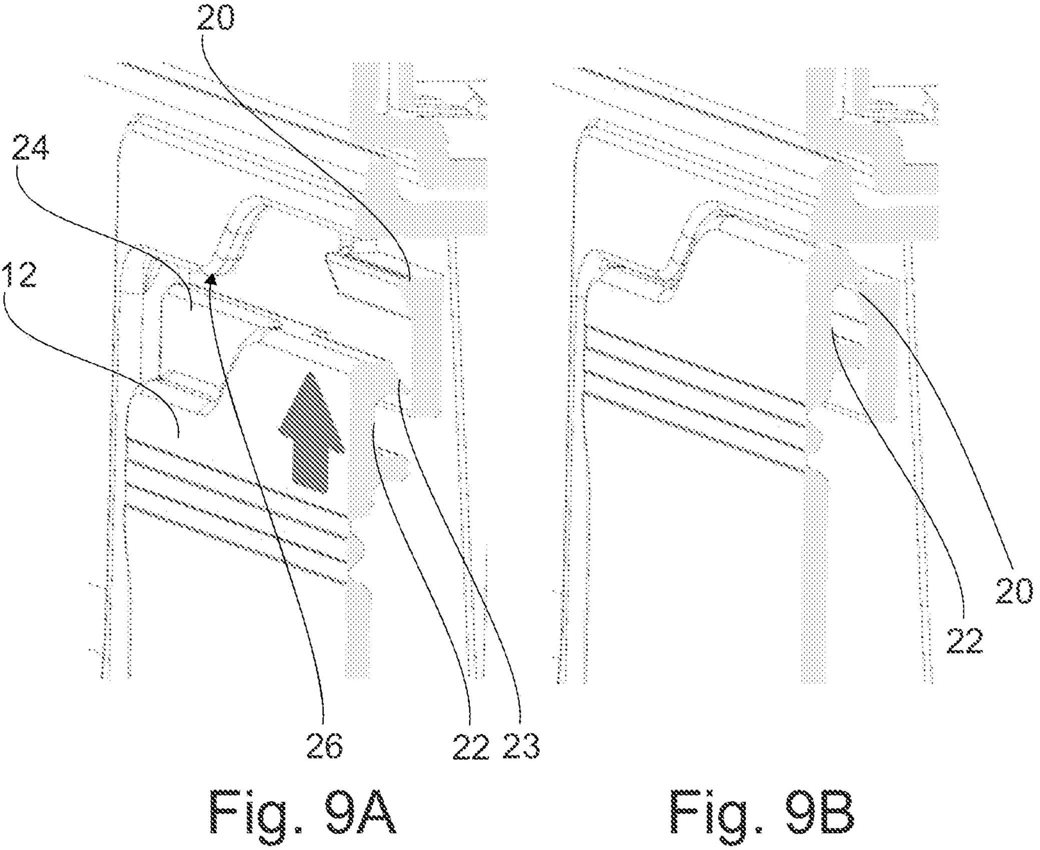
FIGS. 9A and 9B show a detailed view of the latch mechanism for securing the cover to the container.

In the embodiment shown, as can best be seen in FIGS. 9A and 9B, a latch nose or latch projection 20 is arranged above the outlet recess 6 on the outer surface of the indent. This latch projection 20 is adapted and provided to engage with a corresponding latch recess 22 on the base portion 12 of the cover 10. The latch recess 22 is located in an upper portion of the base portion 12 facing the container inside. A guide chamfer 23 is formed between the upper edge of the base portion 12 and an upper edge of the latch recess 22 to allow sliding over the latch nose 20, which is also chamfered, to create a snap effect. A guide rib 24, which is inserted into a complementary groove or into a guide slit 26 on the upper rim of the indent above the outlet recess 6 in the container 1, ensures a guided assembly movement and a secure snap-in of the cover 10 during assembly on the container 1.

Figure 10:
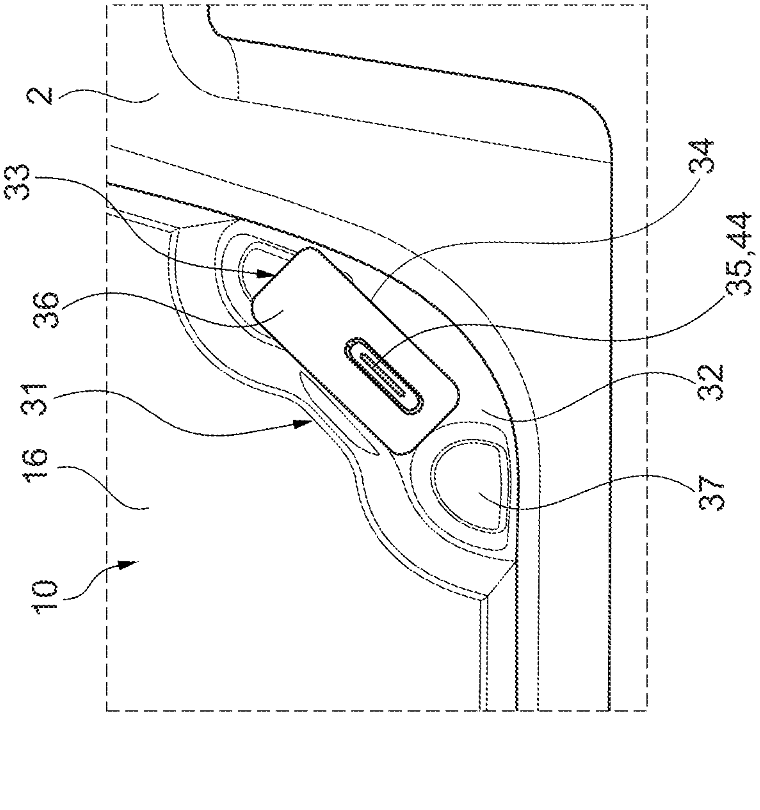
FIG. 10 shows an external view of a sealing device for securing a cover for an outlet recess according to a modification of one of the configuration examples described above, in a closed and sealed state.

FIG. 10 shows an external view of a sealing device 31 for securing a cover 10 for an outlet recess 6 according to a modification of one of the configuration examples described above in a closed and sealed state. This modification may be combined with any of the embodiments described above. Apart from the differences described below, the container according to the modification corresponds to one of the preceding embodiments, in particular to the first embodiment, and corresponding features are not described twice.

The sealing device 31 shown in FIG. 10 is provided on a side opposite the hinge assembly 14, in this example on a lower corner, of the closure portion 16 of the cover 10. The closure portion 16 forms an indentation 32 in the area of the sealing device 31, so that the sealing device 31 is recessed with respect to an outer surface of the closure portion 16 towards the container inside. A seal 33 is inserted into the sealing device 31, wherein a rectangular, plate-like base portion 34 of the seal 33 is arranged outside the container 1 in the indentation 32, while a spreading portion 35 of the seal projects inwards. Through an elongated opening 40 of the base portion 34, a foot 44 of the spreading portion 35 of the seal 33 arranged therein is visible. The structure of the seal 33 will be described in more detail later with reference to FIGS. 15A to 15C. The elongated opening 40 is arranged decentrally with respect to the base portion 34 and is preferably oriented according to a longitudinal direction of the rectangular base portion 34. The base portion 34 is arranged such that it protrudes laterally and forms a kind of tab 36. Troughs 37 are provided in the indentation 32 on both sides of the seal 33. The tab 36 extends to the side in such a way that it is arranged at least partially above one of the troughs 37 and it is thus possible to reach into the corresponding trough 37 and under the tab 36.

Figure 11:
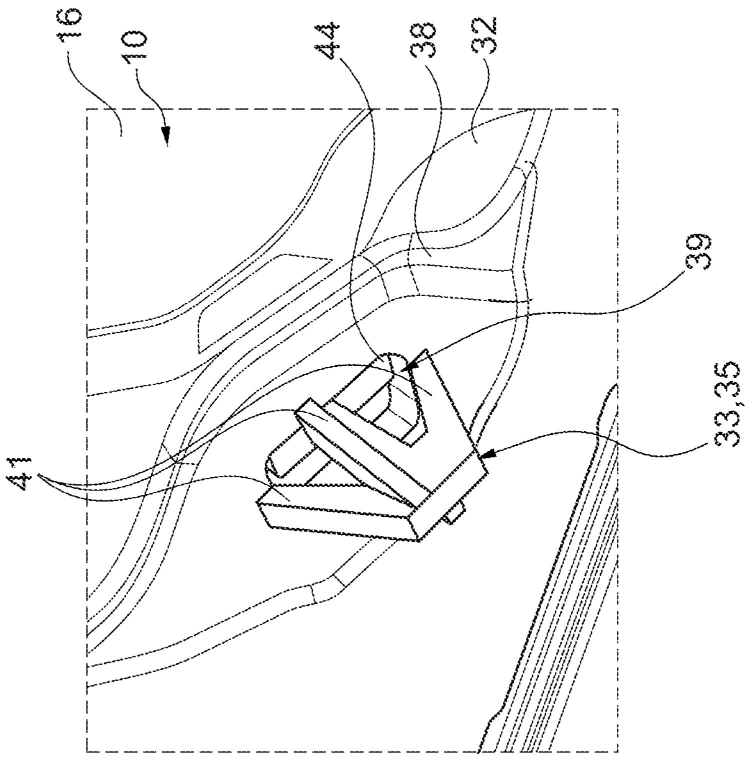
FIG. 11 shows an internal view of the sealing device from FIG. 10.

FIG. 11 shows an internal view of the outlet recess 6 in the area of the sealing device 31 from FIG. 10. The sealing device 31 has a transverse rib 38, which is formed in a corner of the outlet recess 6 and extends into the outlet recess 6 parallel to a corresponding side wall 4 of the container 1 or to a corresponding outer surface of the bottom 2. The closed closure portion 16 is arranged on the outside of the transverse rib 38. A transverse-rib sealing hole 39 is arranged in the transverse rib 38. Since the seal 33 is inserted in the sealing device 31, the seal 33, or more precisely a spreading portion 35 of the seal 33, protrudes from the transverse-rib sealing hole 39 towards the container interior. Anchor-like spring arms 41 of the spreading portion 35 are spread on the inside of the transverse rib 38, thus blocking outward movement of the seal 33. Furthermore, it can be seen that a cross-section of the foot 44 of the spreading portion 35 is rectangular and a length of the rectangular cross-section of the foot 44 substantially corresponds to a length of the transverse-rib sealing hole 39, so that slippage of the seal 33 in the transverse-rib sealing hole 39 is at least partially restricted. The foot 44 is connected to the base portion 34 and, when the seal 33 is inserted, extends through the transverse-rib sealing hole 39 and a cover sealing hole 42 described in more detail below with reference to FIG. 13.

Figure 12:
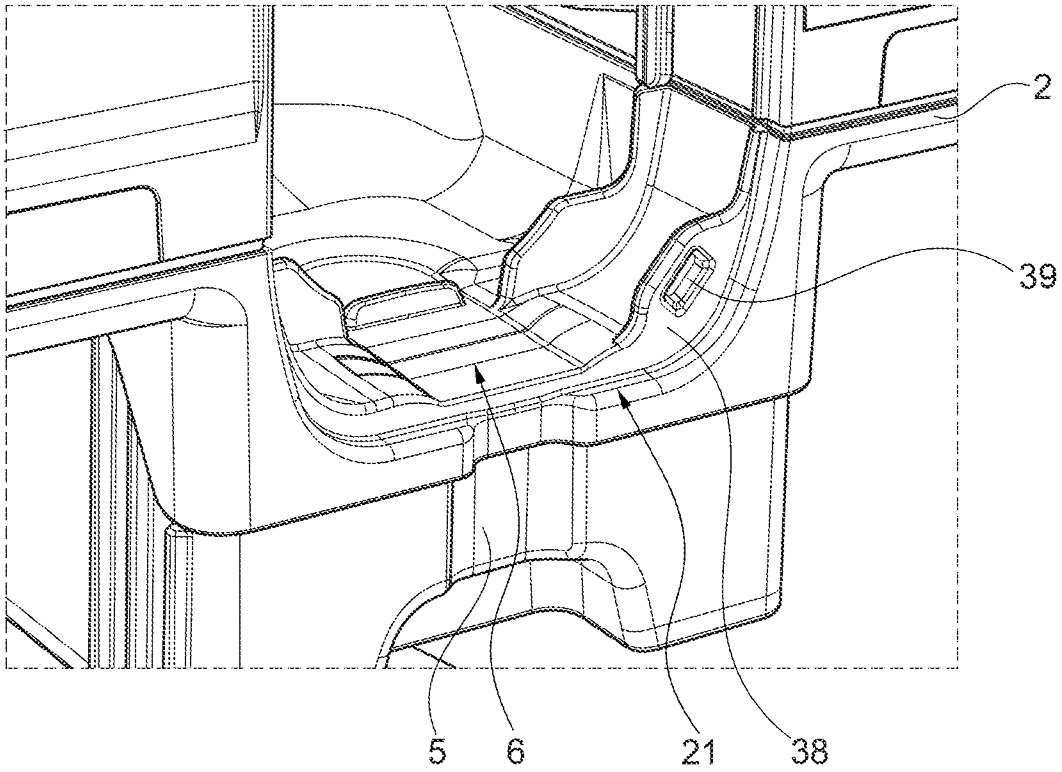
FIG. 12 shows the outlet recess according to the modification.

FIG. 12 shows the outlet recess 6 according to the modification. The arrangement of the transverse rib 38 in a lower corner of the outlet recess 6 as well as the rectangular transverse-rib sealing hole 39 arranged centrally therein are clearly visible. Furthermore, the transverse rib 38 is offset via a setback 21 with respect to an outer surface of the container 1, in particular of the bottom 2, surrounding the outlet recess 6. A depth of the setback 21 corresponds substantially to a thickness of the closure portion 16, so that in the closed state, the latter abuts the transverse rib 38 on the inside, as shown in FIG. 11, and is flush with the outer surface on the outside, as shown in FIG. 10.

Figure 14:
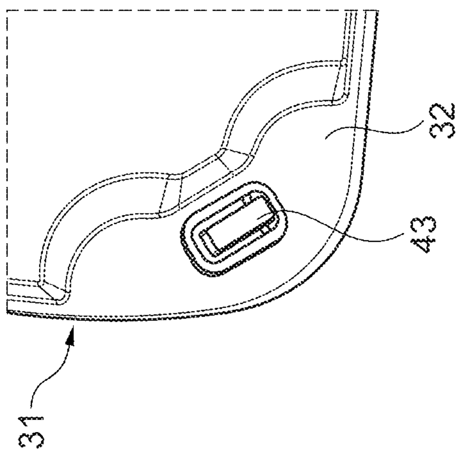
FIG. 14 shows an internal detail view of the sealing portion of the cover from FIG. 13 with the cover plug.
Figure 13:
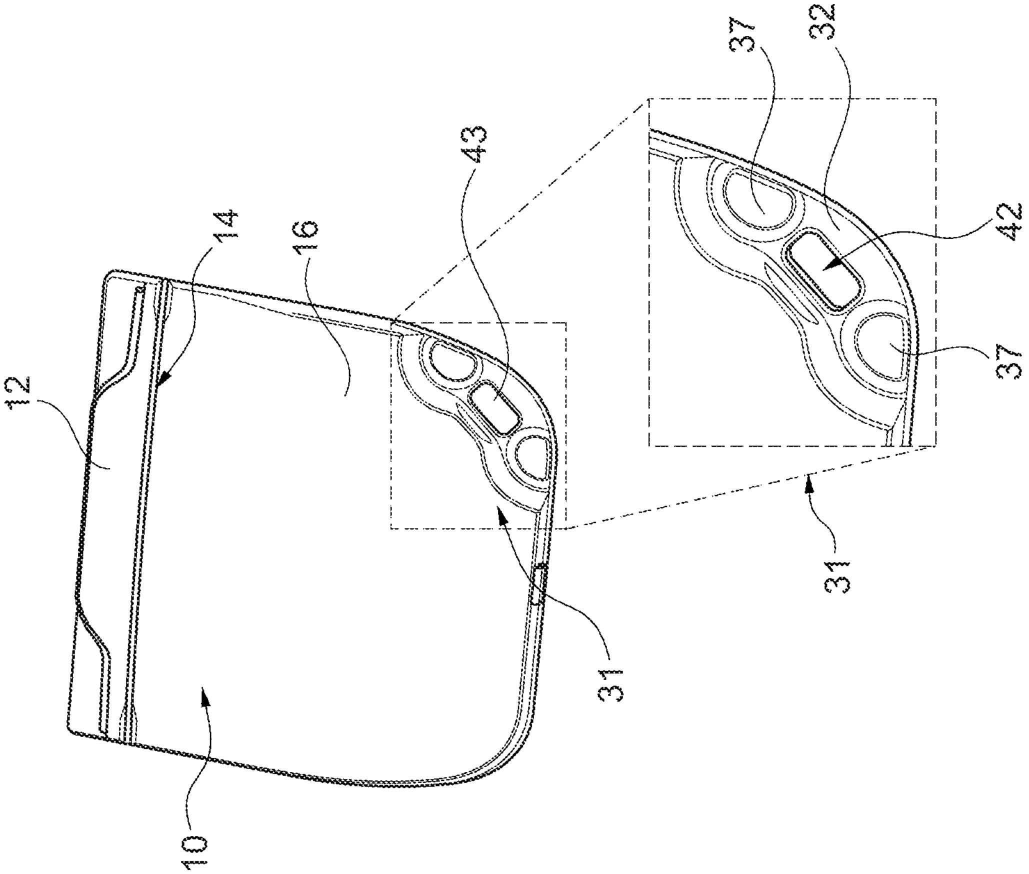
FIG. 13 shows an external view of the cover according to the modification with a cover plug and a detailed view of a sealing portion of the cover without the cover plug.

FIG. 13 shows an external view of the cover 10 according to the modification to illustrate the arrangement of the sealing device 31 at the corner of the cover 10 opposite the hinge assembly 14. Furthermore, a detailed view of the sealing portion 31 of the cover 10 is shown with a cover sealing hole 42 centrally located in the indentation 32. In FIG. 10, this cover sealing hole 42 is covered by the seal 33 inserted therein. Since the seal 33 is not inserted in FIG. 13, the troughs 37 on both sides of the cover sealing hole 42 are not covered by the tab 36. In the external view of the cover 10, a cover plug 43 is inserted into the cover sealing hole 42 instead of the seal 33 in order to close it when a seal 33 is not required. The cover plug 43 forms a flat lid on the outside. On the inside, as shown in FIG. 14, the cover plug 43 has clip arms which engage in a step provided on the inside of the closure portion 16 in the area of the sealing device 31 (in particular formed to run around the cover sealing hole).

Figure 15A:
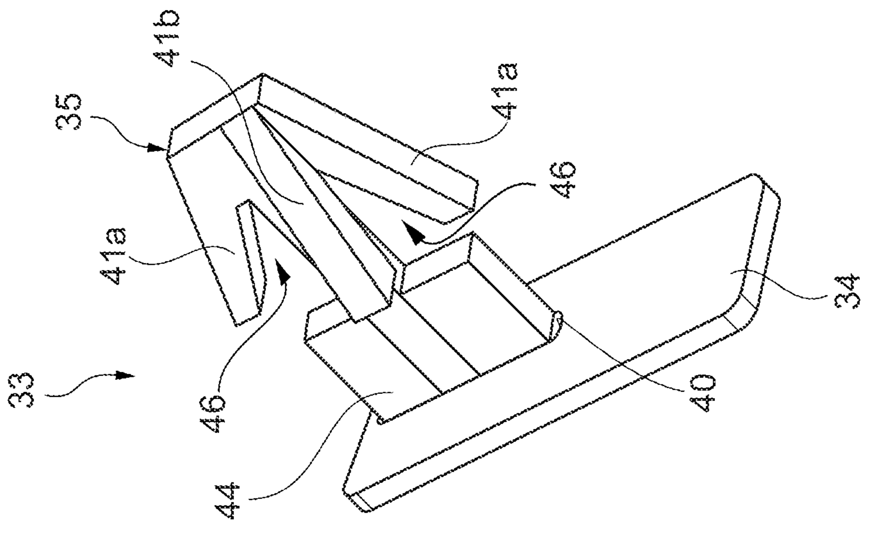
FIG. 15A, FIG. 15B and FIG. 15C show a seal according to the modification from different perspectives.
Figure 15B:
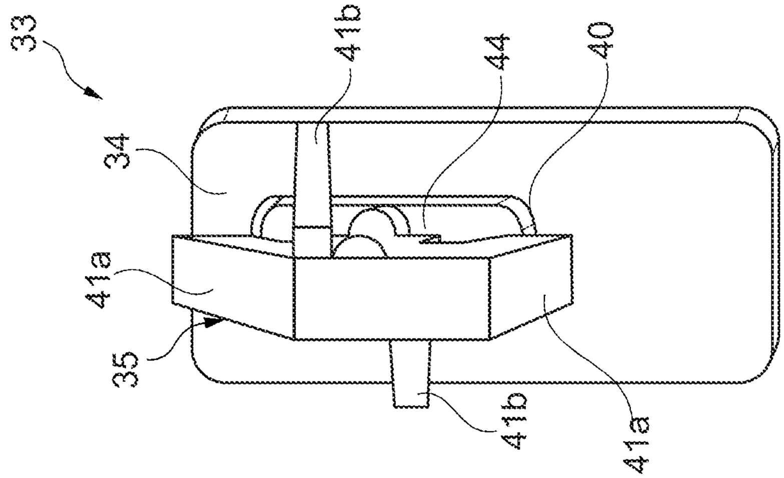
Figure 15C:
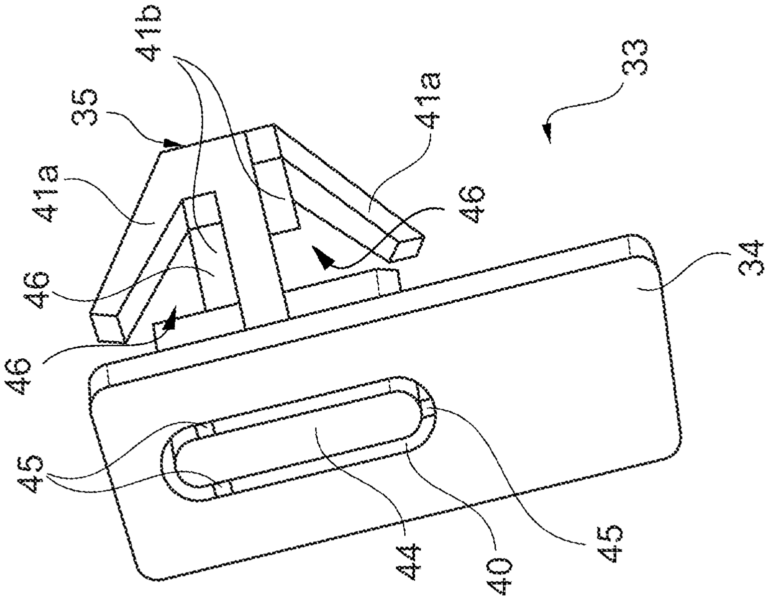

FIG. 15A, FIG. 15B and FIG. 15C show a seal 33 according to the modification from different perspectives. As can be seen particularly well in FIG. 15C, the spreading portion 35 is arranged via the foot 44 decentrally on the base portion 34, more precisely, in the elongated opening 40 of the base portion 34, and connected thereto via predetermined breaking points 45. More specifically, a slit formed by the elongated opening 40 between the foot 44 and the base portion 34 is bridged by the predetermined breaking points 45. In this example, three predetermined breaking points 45 are provided distributed in the slit by way of example. The foot 44 extends perpendicular to the base portion 34 (cf. FIG. 15A) and is narrowed in an area facing away from the base portion 34, which is located on the inside of the transverse rib 38 when the seal is inserted in the sealing device 31, in order to provide clearance 46 for the spring arms 41 arranged in an anchor-like manner at the inner end of the spreading portion 35, said spring arms 41 bending in the direction of the narrowed area of the spreading portion 35 (i.e. into the clearance 46) during spring deflection, so that a total extension of the spreading portion 35 defined by the spring arms 41 can become smaller than a cross-section of the transverse-rib sealing hole 39 and of the cover sealing hole 42. As can be seen in particular in a top view of the spreading portion 35 shown in FIG. 15B, the spring arms 41 comprise two main spring arms 41*a*, which are oriented parallel to the rectangular foot 44 from the perspective of the top view and are preferably of the same width as the foot 44 (have the same material thickness). Furthermore, the spring arms 41 comprise two secondary spring arms 41*b* which, from the perspective of the top view, are oriented perpendicular to the rectangular foot 44 and the main spring arms 41*a* and are preferably narrower than the latter. It should be noted that the main and secondary spring arms 41*a*, 41*b* additionally extend in the direction of the base portion 34, i.e., run diagonally to the foot 44 to form arms of the anchor shape of the spreading portion 35.

Figure 16A:
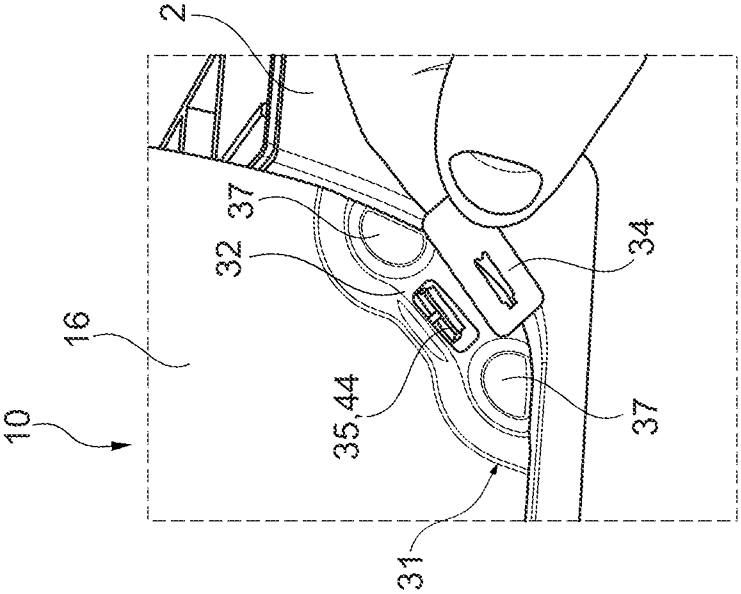
FIG. 16A shows the sealing device being broken open.
Figure 16B:
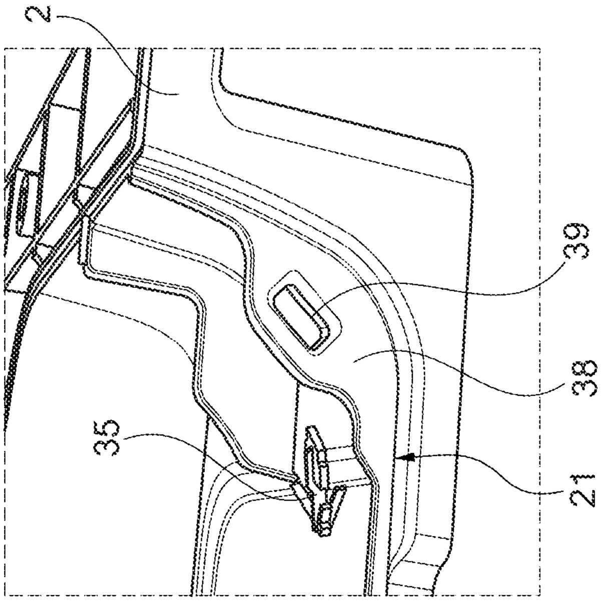
FIG. 16B shows the open outlet recess after being broken open.
Figure 16C:
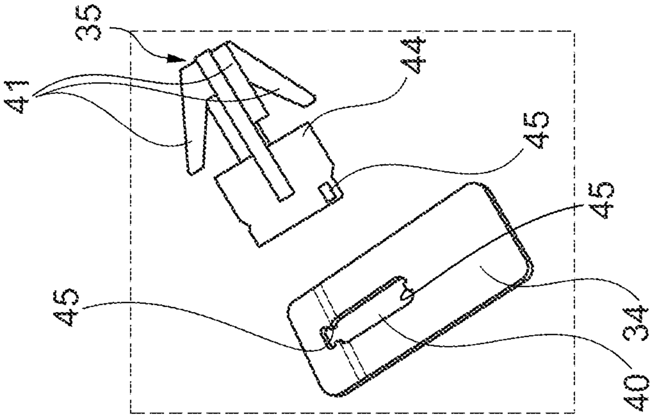
FIG. 16C shows the broken seal, each according to the modification.

FIG. 16A shows breaking open of the sealing device 31, wherein the seal 33 is gripped or is grippable at the tab 36 formed by the base portion 34, since the tab 36 in connection with the troughs 37 of the sealing device 31 is particularly suitable for gripping the seal 33. FIG. 16B shows the opened outlet recess 6 after breaking open, wherein the spreading portion 35 was broken off from the base portion 34 (shown in FIG. 16C) at the predetermined breaking points 45 and fell inwards into the outlet recess 6. FIG. 16C shows the broken seal 33, in which the broken predetermined breaking points 45 are clearly visible.

The invention claimed is:

1. A container for transporting and storing liquid, viscous, or free-flowing substances, the container comprising a bottom, a side wall, and at least one outlet recess in the bottom and/or the side wall, in which an outlet valve is arranged or arrangeable and which is closable via a cover on an outside of the container, the cover comprising a base portion, via which the cover is attached or attachable to the container, and a closure portion, which is hinged to the base portion via a hinge assembly so as to be pivotable about a rotation axis, said closure portion being transferable from a first position closing the at least one outlet recess into a second position releasing the at least one outlet recess, the hinge assembly being configured to hold or lock the closure portion in the second position releasing the at least one outlet recess in a self-supporting manner, and the hinge assembly being configured as a curved film hinge defining a longitudinal dimension and comprising a bend along the longitudinal dimension, such that the curved film hinge is curved relative to the rotation axis, and such that the curved film hinge is prestressed so as to bias the closure portion toward the first position or the second position, depending on a relative position of the curved film hinge with respect to a pressure point.

2. The container according to claim 1, wherein the closure portion, in the second position, is rotated about the rotation axis by an angle of 135° to 190° with respect to the first position.

3. The container according to claim 1, wherein the closure portion is oriented substantially vertically in the first position closing the at least one outlet recess.

4. The container according to claim 1, wherein the base portion is detachable and attachable to the container without tools.

5. The container according to claim 1, wherein the base portion is attachable to the container via a snap connection in proximity to the at least one outlet recess.

6. The container according to claim 1, wherein the base portion has a guide rib and the container has a corresponding guide slit in proximity to the at least one outlet recess.

7. The container according to claim 1, wherein the cover is manufactured in one piece as a plastic component.

8. The container according to claim 1, wherein the base portion and the closure portion have a plate structure and are joined together at adjacent side edges by the hinge assembly.

9. The container according to claim 1, wherein in the first position, the closure portion fits flush into an outer surface of the bottom and/or of the side wall.

* * * * *